No. 840,179. PATENTED JAN. 1, 1907.
A. VOGELSANG.
APPARATUS FOR PURIFYING SEWAGE.
APPLICATION FILED AUG. 24, 1905.
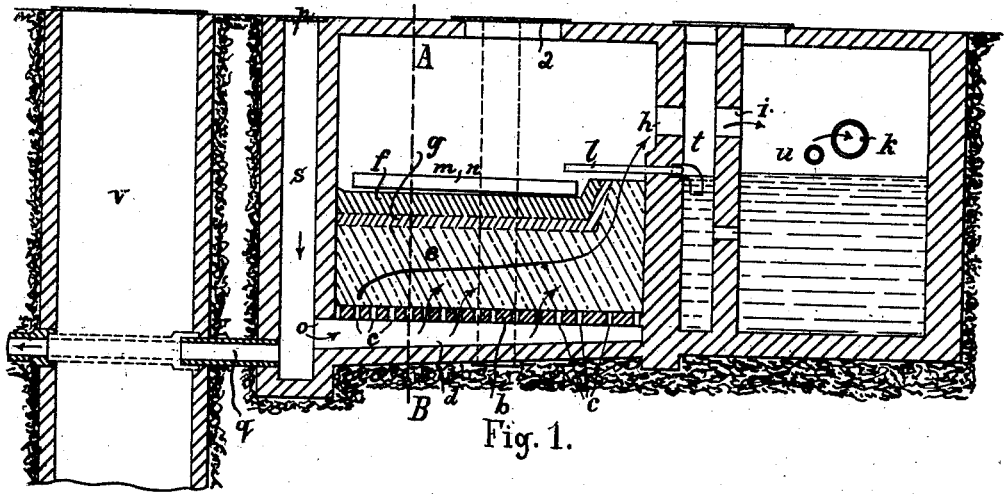
Fig. 1.
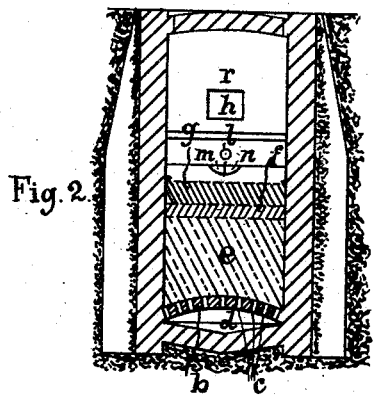
Fig. 2.
Fig. 3.
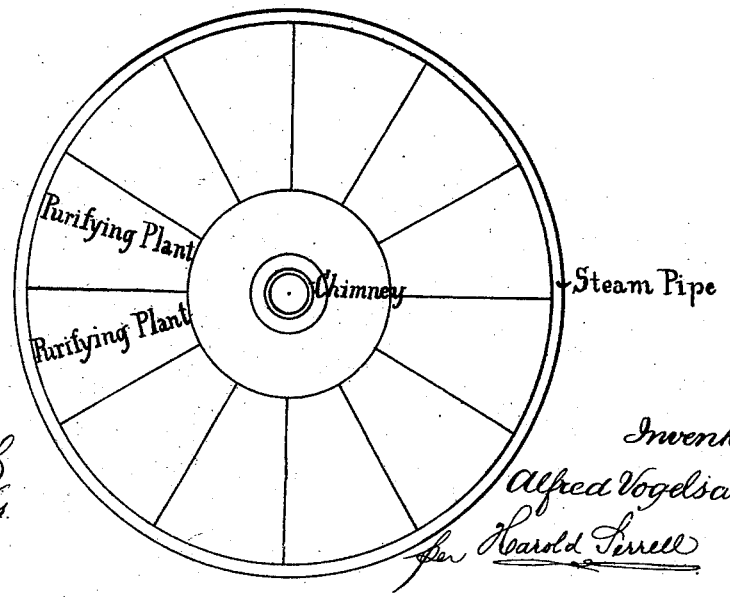
Witnesses
Chas. A. Smith
Leopold —
Inventor
Alfred Vogelsang
per Harold Serrell
Atty.

UNITED STATES PATENT OFFICE.

ALFRED VOGELSANG, OF DRESDEN, GERMANY.

APPARATUS FOR PURIFYING SEWAGE.

No. 840,179.  Specification of Letters Patent.  Patented Jan. 1, 1907.

Application filed August 24, 1905. Serial No. 275,550.

*To all whom it may concern:*

Be it known that I, ALFRED VOGELSANG, a subject of the King of Prussia, German Emperor, and a resident of Dresden, Kaitzerstrasse 12, Kingdom of Saxony, German Empire, have invented a new and useful Improvement in Apparatuses for Purifying Sewage, of which the following is a specification.

My invention relates to an apparatus for purifying sewage; and the primary object thereof is the provision of an apparatus of this nature wherein means are employed for effecting a sufficient natural draft through the purifying medium to produce a complete clarification of the liquid passing through the purifying medium, dispensing with mechanical means for creating a draft.

In carrying out my invention I employ a vault or purifying-tank, which may be placed at any depth below the surface of the ground and is provided with a grate or perforated bottom, an air-shaft sunk in the ground to a depth somewhat below the bottom of the tank and communicating with a space below the said grate or perforated tank bottom, thereby providing for the ingress of the air and the egress of the clarified liquid, a purifying material within the tank and arranged in layers of different sizes superimposed except at one side of the tank, where each layer is banked and extends to approximately the same height, a settling-tank, a chimney, communications from the interior of the purifying-tank through the settling-tank to the chimney, means for conveying the sewage from the settling-tank to the uppermost layer of purifying material in the purifying-tank, and a vessel for receiving the clairified liquid.

Figure 1 shows a vertical section of the complete purifying apparatus; Fig. 2, a vertical transverse section to the line A B of Fig. 1, and Fig. 3 a diagrammatic plan of a purifying plant of greater dimensions and composed of several purifying-bodies.

The purifying vessel or tank $r$ and the entire purifying plant may be built of bricks, concrete, earthenware, or similar material, and the purifying-tank $r$ is tightly closed at its top, preferably, by an iron plate. The bottom of the vessel is provided with a grate or perforated bridge $b$ and may be formed in any simple manner—for instance, by placing bricks in staggered positions between which the openings $c$ are provided. This bottom is vault-shaped, as shown in Fig. 2, so that a passage $d$ is formed underneath the entire filter-body, and to this passage the air is supplied, and the purified sewage is carried off, and for a better distribution of the air underneath the complete purifying vessel and for facilitating the exit of the clarified liquid this passage may be of conical shape. The passage is directly connected to an air-shaft $s$ for admitting air.

The purifying vessel $r$ is provided in one of its walls with an exit $h$ and is partially filled with a purifying or filtering substance—such, for instance, as coke, slag—and may preferably be used in three layers $e\, f\, g$ of as many different sizes. The thickness of the layers necessarily varies with circumstances. The layer $e$ of the coarsest slag is preferably the thickest one, being the lowermost, whereas the layer of the finest slag forms the upper covering. The layer of the coarsest slag is banked on one side nearly up to the exit-passage $h$ in the brickwork of the narrow side of the vessel $r$, and the upper and intermediate layers of filtering material are similarly banked. By these means the air circulating from below to above is distributed in a better manner within the entire filtering-body, as indicated by the arrows in Fig. 1, and may reach in an easier manner the upper part of the settling vessel $t$. From this vessel $t$ the air enters by the aperture $i$ into the upper part of the settling-tank $u$ and circulates from the latter through the pipe $k$ to a chimney either of the house or an independent structure.

A pipe $l$ from the settling vessel $t$ supplies the sewage to one or more distributing-conduits $m\ n$, preferably of V-shaped section, from which the sewage is continuously supplied to the uppermost layer of filtering material. After passing through all of the filtering layers the clarified water passes through the slots $c$ to the conduit $d$, and from the latter through the opening $o$ to the lowermost part of the air-shaft $s$, which may preferably be covered by a sieve-plate $p$. The purified sewage is carried off from the lowermost part of the air-shaft through a passage or conduit $q$ to the collecting tank or vessel $v$, as shown in Fig. 1.

The complete process of purification is as follows: Whereas the air is admitted at $p$ into the shaft $s$, and in consequence of the draft created by the chimney circulates through the opening $o$, the conduit $d$, the slots $c$, the filtering layer $e$, the openings $h$ to the settling vessel $t$ and through the opening $i$ to the tank $u$, and finally through the pipe $k$ to the chimney, carrying with it all gases arising from the sewage, while the sewage passes in the opposite direction from the settling vessels $t$ and $u$, which are closed at their upper parts by a cover or lid by way of the supply-pipe $l$ on to the distribution-conduits $m$ $n$. The sewage trickles or penetrates through the filtering layers $g$ $f$ $e$, enters the conduits $d$ by way of the openings $c$, and passes on through the opening $o$ into the lowermost part of the shaft $s$ and then through the passage or conduit $q$ into the collecting basin or vessel $v$ in a completely-purified and inodorous state.

Instead of one purifying apparatus of the construction described above it may be preferable to combine several such apparatus as a purifying or filtering plant as may be required, and these apparatus may be so arranged that all are in connection with a central main chimney, as shown in the diagram of Fig. 3. In some cases it may be desirable to provide a steam-pipe around the entire plant as an auxiliary means for heating the air, by which heating the purifying process is materially assisted by increasing the circulation of the air through the purifier, and, moreover, purifying plants arranged according to the present invention in which the oxidizing process takes place in a vault which is entirely closed makes it possible to place such purifying plants in the immediate neighborhood of dwelling-houses and also in densely-populated districts.

I claim as my invention—

1. An apparatus for purifying sewage comprising a vault, an apertured bridge within said vault, layers of filtering material on the said bridge, an air-shaft providing a direct communication from the atmosphere to the passage-way beneath the said bridge, a settling-tank adjacent to said vault and means establishing communication between the interiors of the said vault and tank and for conveying the sewage from the settling-tank to and distributing the same upon the uppermost layer of the said purifying material, a chimney and a connection between the said chimney and the interior of the said vault.

2. An apparatus for purifying sewage, comprising a vault, an apertured bridge within said vault, layers of filtering material placed on the said bridge, an air-shaft providing a direct communication from the atmosphere to the passage-way beneath the said bridge, a settling-tank adjacent to said vault and means establishing communication between the interiors of the said vault and tank and for conveying the sewage from the settling-tank to and distributing the same upon the uppermost layer of the said purifying material, a chimney, a connection between the said chimney and the interior of the said vault, a collecting-tank for receiving the clarified liquid and a passage between the same and the bottom of the said shaft.

3. An apparatus for purifying sewage comprising a vault placed beneath the ground, an apertured bridge within said vault, layers of filtering material of different sizes placed on the said bridge, each layer being banked to the same height at one side of the said vault, an air-shaft providing a direct communication from the atmosphere to the passage-way beneath the said bridge, a settling-tank in communication with the interior of the said vault, means for conveying the sewage from the settling-tank to and distributing the same upon the uppermost layer of the said purifying material, a chimney and a connection between the said chimney and the interior of the said vault.

4. An apparatus for purifying sewage, comprising a vault placed beneath the ground, an apertured bridge within said vault, layers of filtering material of different sizes placed on the said bridge, each layer being banked to the same height at one side of the said vault, an air-shaft providing a direct communication from the atmosphere to the passage-way beneath the said bridge, a settling-tank in communication with the interior of the said vault, means for conveying the sewage from the settling-tank to and distributing the same upon the uppermost layer of the said purifying material, a chimney, a connection between the said chimney and the interior of the said vault, a collecting-tank for receiving the clarified liquid and a passage between the same and the bottom of the said shaft.

5. An apparatus for purifying sewage, comprising an entirely-closed vault, a perforated bottom extending entirely across the lower part of the said vault, a purifying body placed on said perforated bottom, a free connection between the atmosphere and the chamber beneath the said perforated bottom, a chimney apart from said vault and a connection between said chimney and the chamber in said vault above the said filtering material.

6. An apparatus for purifying sewage, comprising an entirely-closed vault, an arched perforated bottom extending entirely across the lower part of said vault, a connection between the atmosphere and the chamber beneath the said arched perforated bottom, a floor beneath the said arched perforated bottom inclining toward the said connection, a filtering material on said arched perforated bottom and banked along the side of the vault opposite the said connection, a chimney apart from said vault and a connection between said chimney and the chamber within the vault above the said filtering material.

In testimony that I claim the foregoing as my invention I have signed my name, in presence of two witnesses, this 9th day of August, 1905.

ALFRED VOGELSANG.

Witnesses:
PAUL E. SCHILLING,
PAUL ARRAS.